(12) United States Patent
Panni et al.

(10) Patent No.: US 12,544,704 B2
(45) Date of Patent: Feb. 10, 2026

(54) SEPARATION COMPONENT FOR A FILTER ELEMENT

(71) Applicant: MANN+HUMMEL GmbH, Ludwigsburg (DE)

(72) Inventors: Andreas Panni, Oestringen-Odenheim (DE); Bruno Boehl, Harthausen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 745 days.

(21) Appl. No.: 17/742,569

(22) Filed: May 12, 2022

(65) Prior Publication Data

US 2022/0266188 A1 Aug. 25, 2022

Related U.S. Application Data

(63) Continuation of application No. PCT/EP2020/080378, filed on Oct. 29, 2020.

(30) Foreign Application Priority Data

Nov. 14, 2019 (DE) ...................... 10 2019 130 770.8

(51) Int. Cl.
| | |
|---|---|
| *B01D 46/52* | (2006.01) |
| *B01D 29/11* | (2006.01) |
| *B01D 29/21* | (2006.01) |
| *B01D 46/00* | (2022.01) |
| *B01D 46/24* | (2006.01) |

(52) U.S. Cl.
CPC .......... *B01D 46/528* (2013.01); *B01D 29/111* (2013.01); *B01D 29/216* (2013.01); *B01D 46/0001* (2013.01); *B01D 46/003* (2013.01); *B01D 46/2411* (2013.01);
(Continued)

(58) Field of Classification Search
None
See application file for complete search history.

(56) References Cited

U.S. PATENT DOCUMENTS 3,856,487 A * 12/1974 Perez ..................... B01D 47/06
96/240
5,230,726 A 7/1993 Smith et al.
(Continued)

FOREIGN PATENT DOCUMENTS

| CN | 2575061 Y | 9/2003 |
|---|---|---|
| DE | 2161352 A1 | 6/1972 |

(Continued)

*Primary Examiner* — Bobby Ramdhanie

(57) ABSTRACT

A separation component for a filter element has a web-shaped support body with a top rim and a bottom rim. A web-shaped separator body covers a side face of the support body completely or partially. Support body and separator body are wound to a spiral shape with axially successive turns. The support body has a connecting fold at the top rim and at the bottom rim, respectively. The connecting folds engage each other in the axially successive turns of the spiral shape. The separation component can be manufactured by placing a web-shaped separator body onto a web-shaped support body and by winding support body and separator body to a spiral shape. During winding, a connecting fold at a top rim of a turn of the spiral shape and a connecting fold at a bottom rim of an axially successive turn are brought into engagement with each other.

14 Claims, 3 Drawing Sheets

(52) U.S. Cl.
CPC .. *B01D 2201/0415* (2013.01); *B01D 2265/06* (2013.01); *B01D 2275/105* (2013.01)

(56) References Cited

U.S. PATENT DOCUMENTS

| | | | | |
|---|---|---|---|---|
| 6,099,726 | A | * | 8/2000 | Gembolis .......... B01D 46/4209 |
| | | | | 210/243 |
| 6,256,851 | B1 | * | 7/2001 | Goedelmann ......... B21C 37/157 |
| | | | | 29/33 D |
| 11,154,805 | B2 | | 10/2021 | Nimtz |
| 2003/0006186 | A1 | * | 1/2003 | Pulek ................... B01D 63/103 |
| | | | | 210/497.1 |
| 2004/0031748 | A1 | | 2/2004 | Kochert et al. |
| 2009/0235506 | A1 | | 9/2009 | Castricum |
| 2010/0122447 | A1 | * | 5/2010 | Peterson ............... E21B 43/084 |
| | | | | 29/505 |
| 2015/0375143 | A1 | | 12/2015 | Kathan et al. |
| 2016/0121243 | A1 | * | 5/2016 | Altwies ................. B01D 29/27 |
| | | | | 210/435 |
| 2016/0280490 | A1 | | 9/2016 | Erdem et al. |
| 2019/0111371 | A1 | | 4/2019 | Nimtz |

FOREIGN PATENT DOCUMENTS

| | | | | |
|---|---|---|---|---|
| DE | 202008005672 | U1 | 9/2009 | |
| GB | 1337170 | A * | 11/1973 | ........... B01D 29/111 |
| GB | 2088421 | A | 6/1982 | |
| JP | H04114405 | U | 10/1992 | |
| JP | H0640939 | B2 | 6/1994 | |

\* cited by examiner

SEPARATION COMPONENT FOR A FILTER ELEMENT

CROSS-REFERENCE TO RELATED APPLICATIONS

This application is a continuation application of international application No. PCT/EP2020/080378 having an international filing date of 29 Oct. 2020 and designating the United States, the international application claiming a priority date of 14 Nov. 2019 based on prior filed German patent application No. 10 2019 130 770.8, the entire contents of the aforesaid international application and the aforesaid German patent application being incorporated herein by reference.

BACKGROUND OF THE INVENTION

The invention relates to a separation component for a filter element, in particular for liquid separation from an aerosol or for particle separation from liquids or gases. The invention relates furthermore to a filter element, in particular for liquid separation from an aerosol or for particle separation from liquids or gases, wherein the filter element comprises a separation component between a top end disk and a bottom end disk. In addition, the invention relates to a filter device with a filter element that is provided with a separation component. Finally, the invention relates to a method for manufacturing a separation component for a filter element.

DE 20 2008 005 672 U1 discloses an air/oil separation device with which oil can be separated from air containing oil mist. The air/oil separation device comprises in a housing an air/oil separation element that is constructed of a hollow-cylindrical support and a nonwoven coil on the support. At the end faces of the air/oil separation element, there are end disks that close the nonwoven coil axially. The air/oil separation element is flowed through radially from the interior to the exterior by the air containing oil mist, wherein the oil droplets are separated at the nonwoven coil and, due to their own weight, flow downwardly into a collection chamber from which the oil is discharged.

Typically, the nonwoven coil in such air/oil separation devices is comprised of a coalescer material.

SUMMARY OF THE INVENTION

It is the object of the invention to provide a separation component for a filter element that can be manufactured in a simple manner.

This object is solved according to the invention by a separation component for a filter element, in particular for liquid separation from an aerosol or for particle separation on liquids or gases, with a support body and with a separator body that covers at least one side face of the support body completely or partially, wherein the support body and the separator body each are embodied web-shaped and wound to spiral shape with axially successive turns, wherein the support body at the top and bottom rim of its web comprises a connecting fold, respectively, and the connecting folds are in engagement with each other in axially successive turns.

The dependent claims provide expedient further embodiments.

The separation component according to the invention can be used in a filter element and serves for separation of liquid droplets or solid particles in a fluid to be purified which is passed through the separation component and which is a liquid or a gas. In a preferred embodiment, the separation component serves for liquid separation from an aerosol, in particular for oil separation from an oil mist, comprised of air with suspended oil droplets. The separation component can be used, as needed, as a secondary separator in air filter applications.

The filter element which contains the separation component can be used as an air/oil separation element of an air/oil separation device. In the invention, an additional filter medium body for the filtration of the fluid may be provided in the filter element for the filtration of the fluid that is being passed through, wherein the separation component is arranged upstream or downstream of the filter medium body.

The separation component comprises a support body and a separator body that covers completely or partially at least one side face of the support body. The support body imparts stability to the separation component and holds the separator body in a desired shape. The separator body is embodied, for example, as a nonwoven web that covers one side face of the support body. According to a preferred embodiment, the separator body is comprised of a coalescer material.

The support body and the separator body are embodied web-shaped, respectively, and advantageously comprise the shape of a flat web in the initial state. For manufacturing the desired shape of the separation component that forms a hollow body and preferably is embodied hollow-cylindrically, support body and separator body are wound to a spiral shape with axially successive turns, wherein each complete turn comprises a web extending about 360° of the support body as well as of the separator body. Due to the spiral shape, each turn in axial direction—in relation to the longitudinal axis of the separation component—is stretched and correspondingly provided with an axial incline, in particular in such a manner that the beginning and the end of a turn that is displaced by at least 300°, in particular by 360°, are axially displaced approximately by the width of the web. One or a plurality of successive turns to which the support body and the separator body are wound, respectively, adjoin axially in the hollow body.

The support body comprises a connecting fold at its top rim and at its bottom rim of its web, respectively. In successive turns, the connecting fold at the top rim of the first turn is in engagement with the connecting fold at the bottom rim of the successive turn.

In this embodiment, the successive turns of the support body are connected with form fit to each other by the mutually engaging connecting folds. This imparts a high degree of stability to the separation component. The connection is realized preferably exclusively by the connecting folds so that no additional connecting measures are required in order to connect successive turns of the support body to each other. The connecting folds can be generated in a simple mechanical manner by bending the top rim and the bottom rim of the web of the support body. Advantageously, the connecting folds at the top rim and the bottom rim of the web are folded over toward different side faces of the web.

The form fit, produced by the connecting folds engaging each other in successive turns, exists preferably in axial direction of the spirally wound separation component. A form fit by the mutually engaging connecting folds can be provided also in radial direction.

In an expedient embodiment, the separator body covers the support body also in the region of the connecting fold. Correspondingly, the connecting fold is formed by the separator body as well as by the support body. The connecting fold is at least of a two-layer configuration and comprises as a first layer the support body and as a second layer the separator body. The separator body can also be bent in a fold shape wherein, for connecting the successive turns, sections of the separator body at the top rim and the bottom rim in successive turns engage each other mutually and contact each other in the mutually engaging connecting folds.

In an alternative embodiment, the separator body may cover the support body only partially and the top rim and the bottom rim of the support body are free of the material of the separator body. The connecting folds at the top rim and the bottom rim of the web of the support body comprise no material of the separator body in this embodiment so that the connection of the successive turns is realized exclusively by the support body. The separator body covers advantageously completely at least at one side face—at the inner side or at the outer side—the spiral-shaped separation component forming a hollow body.

According to a further advantageous embodiment, the separator body is arranged only at one side face of the support body, in particular at the outer side of the support body. Alternatively, in another aspect of the invention, the separator body may be arranged at the inner side of the support body. In another aspect a separator body may be arranged at the outer side as well as at the inner side of the support body, respectively.

According to yet another advantageous embodiment, the support body comprises a grid structure that imparts a high stability to the support body, on the one hand, and permits flow of the fluid through the support body, on the other hand. The support body can be manufactured of a plastic material or of a metal.

The separation component comprises, according to a further advantageous embodiment, a cylindrical spiral shape. Correspondingly, the separation component is embodied hollow-cylindrically, wherein the flow-through is realized in radial direction—in relation to the longitudinal axis of the separator body. For example, it can be expedient that the separator body is located at the outer side of the support body and the flow-through is performed radially from the exterior to the interior or from the interior to the exterior.

In a further embodiment, the separation component is embodied cone-shaped or conus-shaped. In this embodiment, the separation component is also flowed through radially to its longitudinal axis by the fluid to be purified.

A further aspect of the invention relates to a filter element that is used in particular for liquid separation from an aerosol and is provided with an afore described separation component between a top end disk and a bottom end disk. The filter element can comprise, as needed, in flow direction a further separation component so that two separation components are arranged in the filter element in concentric embodiment. The separation components form in this context a main separator and a secondary separator or a pre-separator and a main separator. It can be sufficient, as needed, that the filter element is comprised exclusively of one or of a plurality of separation components. In an alternative embodiment, a filter element with a filter medium body is provided and in addition with a separation component, wherein the separation component can be arranged upstream or downstream of the filter medium body. The filter medium body comprises preferably the same basic geometry as the separation component and, for example, is of a hollow-cylindrical configuration. Filter medium body and separation component are positioned concentrically to each other.

A further aspect of the invention relates to a filter device with an afore described filter element that is provided with a separation component. The filter element is received in a filter housing of the filter device.

A further aspect of the invention relates to a method for manufacturing a separation component for a filter element, in particular an afore described separation component. The separation component can be used for liquid separation from an aerosol, for example, for air/oil separation. In the method, a web-shaped and preferably flat separator body is placed onto an also web-shaped and preferably flat support body. Subsequently, the web-shaped support body and the web-shaped separator body placed on each other are wound to a spiral shape that comprises axially successive turns. During the winding process, a connecting fold at the top rim of a turn of the spiral shape and a further connecting fold at the bottom rim of the successive turn of the spiral shape are brought into engagement with each other. This is realized in particular in the manner that the connecting folds at the top rim and at the bottom rim of the web-shaped support body are produced and brought into engagement with each other during the winding process.

Thus, winding and bending of the connecting folds at the top rim and the bottom rim of the web-shaped support body is realized in the same step wherein, by means of bending, the engagement of the connecting folds is created at the same time. In this context, during winding the connecting fold at the bottom rim is continuously bent in the direction of the first side face and, simultaneously, the connecting fold at the top rim is continually bent in the direction toward the second side face, wherein the connecting folds are already brought into engagement with each other during the bending process. Upon partial engagement of the connecting folds in each other, the bending process is continued until the desired end position of the connecting folds is reached. In the end position, the bent connecting folds are advantageously lying parallel to each other and in addition parallel to the continuous wall of the support body. In the end position, the desired form fit exists between the connecting folds engaging each other.

As needed, it can be expedient that, with the placement of the separator body onto the support body, a connection between separator body and support body is created, for example, by gluing the separator body to the support body or by welding the separator body to the support body. A welding process such as, for example, ultrasonic welding or heated wedge welding, can be used in case that the support body is based on plastic material, as needed, by using an additional material. When the separator comprises metallic components, it can also be welded to a metallic support body.

In an alternative embodiment, it can be sufficient however to loosely place the separator body onto the support body. In another aspect of the invention, the separator body that is comprised of a yielding nonwoven material is pressed against the support body so that the material of the separator body at least partially projects into the grid openings of the support body and, in this manner, a loose connection between separator body and support body is created.

BRIEF DESCRIPTION OF THE DRAWINGS

Further advantages and expedient embodiments can be taken from the additional claims, the figure description, and the drawings.

In the Figures, same components are identified with the same reference characters.

DESCRIPTION OF PREFERRED EMBODIMENTS

Figure 1:
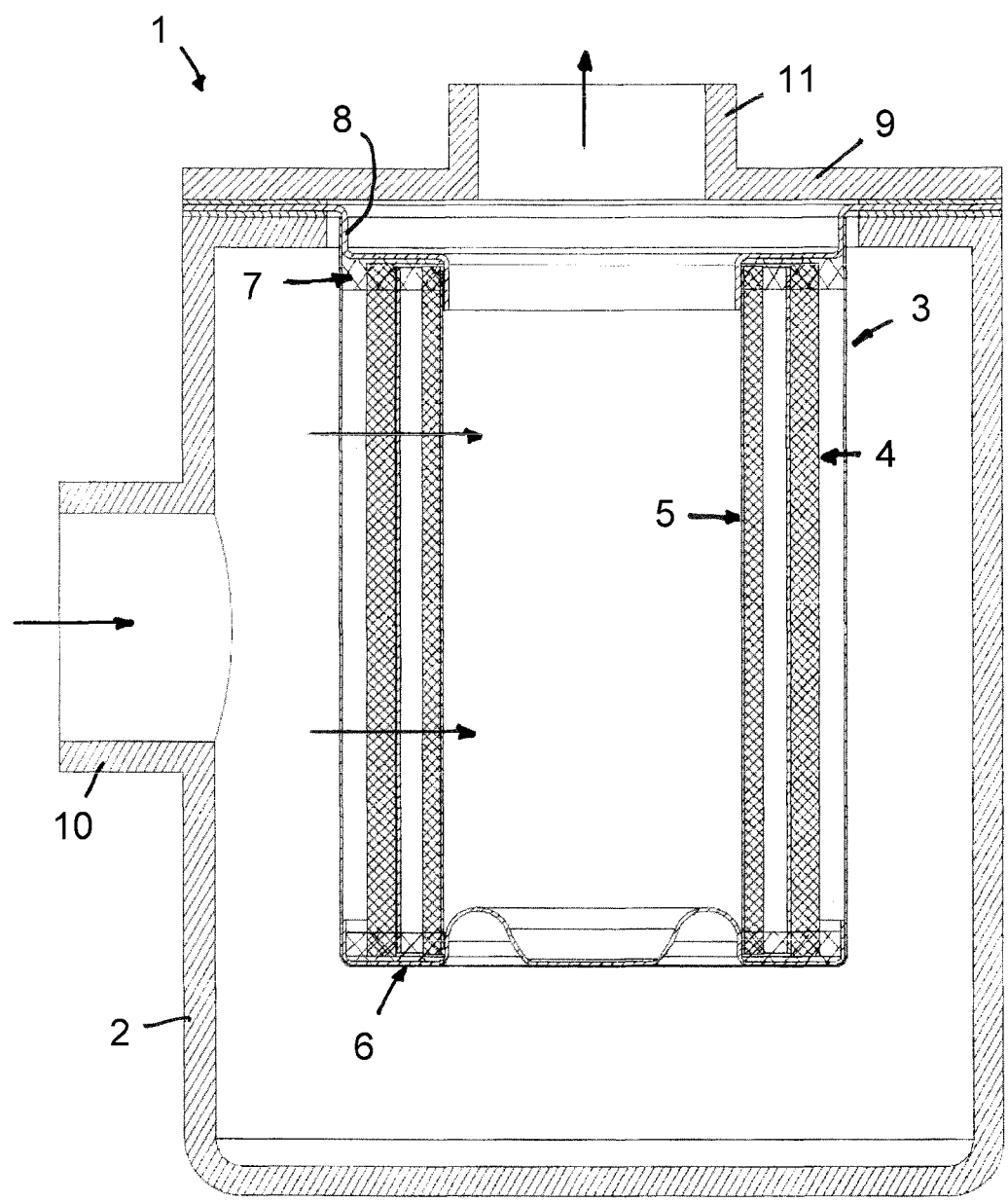
FIG. 1 shows a section lengthwise through a filter device for liquid separation from an aerosol, wherein two concentrically arranged separation components are received in the filter device.

The filter device 1 illustrated in FIG. 1 is an air/oil separation device with which oil droplets can be separated from an air flow. In the cylindrical filter housing 2, a filter element 3 is received that comprises two separation components 4 and 5 that are each hollow-cylindrical and are arranged concentrically and at a radial distance from each other. The radially outwardly positioned separation component 4 forms a main separator, the radially inwardly positioned separation component 5 forms a secondary separator. At the separation components 4, 5, the oil droplets that are entrained in the air flow are separated and axially downwardly discharged. The two separation components 4 and 5 comprise a common bottom end disk 6 and a common top end disk 7, wherein the bottom end disk 6 is embodied closed and flow-tightly seals the interior, while the top end disk 7 comprises a central opening through which the purified air can flow out axially. At the top end disk 7, a flange 8 is provided that is clamped between the top side of the housing 2 and an attachable cover 9, whereby the filter element 3 is safely held in its intended position in the filter housing 2.

The air to be purified is guided radially into the interior of the filter housing 2 through an inflow socket 10 that is located in the wall of the filter housing 2. The purified air is discharged axially via an outflow socket 11 that is located in the cover 9.

The two separation components 4 and 5 comprise the same basic configuration. Both separation components 4, 5 are embodied as wound bodies with an inwardly positioned cylindrical support body and a separator body that is positioned at the exterior side of the support body. The support body is comprised, for example, of plastic material or of metal and can have a grid structure; the support body imparts to the separation component 4 or 5 the required stability and supports the separator body that is manufactured of a soft yielding separation material and that is comprised in particular of a coalescer material. In the separation component 4, the support body can be also realized selectively by round bending a flat pre-cut part that is connected only in longitudinal extension by means of folding or welding.

Figure 2:
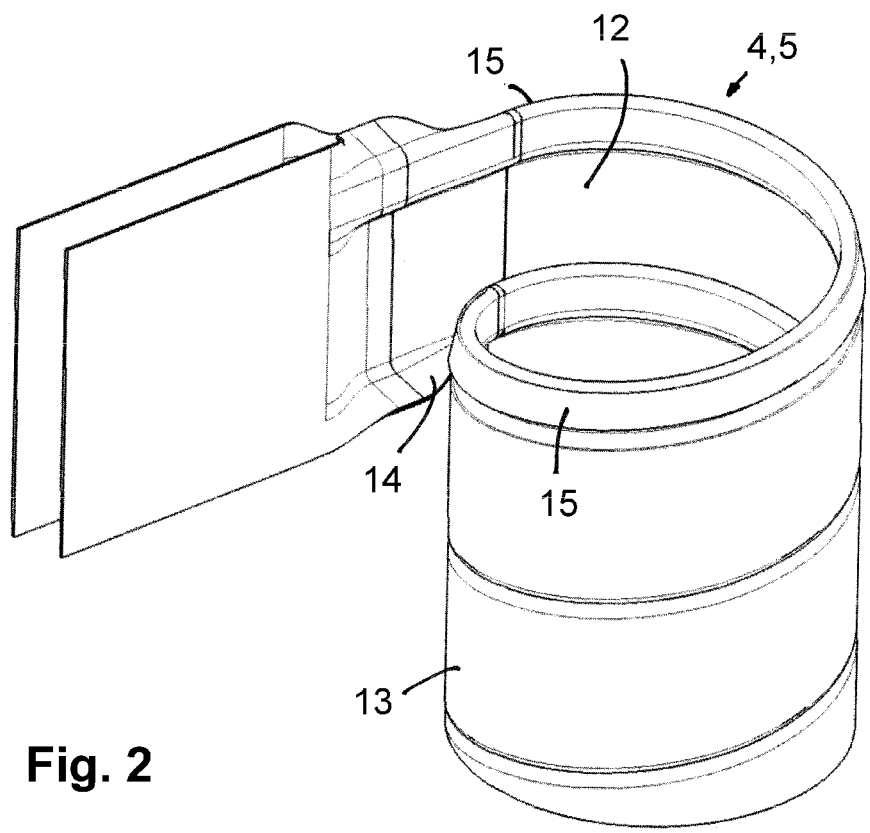
FIG. 2 shows the separation component during the manufacture by means of performing a winding process in which a web-shaped support body and a web-shaped separator body that are positioned on top of each other are spirally wound.
Figure 3:
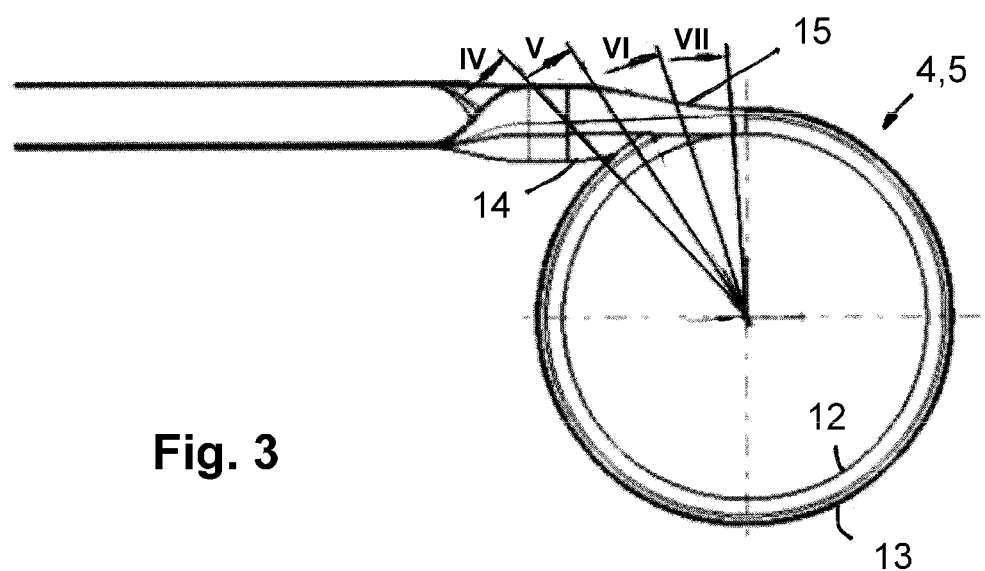
FIG. 3 shows a plan view of the separation component during the winding process.

FIGS. 2 and 3 provide a snapshot during the manufacture of the separation components 4 or 5. The starting material for each separation component 4, 5 is a web-shaped support body 12 as well as a web-shaped separator body 13 which are placed onto each other in their flat spread-out state. It can be expedient to provide an at least loose attachment of separator body 13 on the support body 12, for example, by means of at least point gluing or welding. Alternatively in the invention, the webs of support body 12 and separator body 13 may be only loosely placed on each other and no fixed connection between these components is provided in the initial state.

The two webs placed on each other of support body 12 and separator body 13 are wound in a winding machine spirally in such a manner that a hollow-cylindrical body is produced. The individual turns of the spiral-shaped separation component which extend about 360° comprise thus respectively at the inner side the support body 12 and at the outer side the separator body 13, wherein the individual turns axially adjoin each other due to the spiral shape. The axial incline is selected such that the bottom rim of the second turn is located at the level of the top rim of the first turn. In order to ensure a safe connection of the axially successive turns, the top rim and the bottom rim of each web are bent to a connecting fold 14 or 15. The bottom rim is bent, for example, inwardly in order to form the connecting fold 14, the top rim is bent outwardly in order to form the connecting fold 15. The inwardly positioned side is formed by the support body 12, the outwardly positioned side by the separator body 13.

Bending of the top rim and the bottom rim of the support body 12—including the separator body 13 which covers in the initial state the support body 12 completely at a side face—is realized during the winding process. Upon winding to the spiral, the bottom rim is bent inwardly to the connecting fold 14 and, at the same time, the upper rim is bent outwardly to the connecting fold 15. This bending process is realized continuously during the spiral winding as is illustrated by the section illustrations according to the section lines IV to VII (FIG. 3) that correspond to the individual illustrations according to FIG. 4 to FIG. 7.

Figure 4:
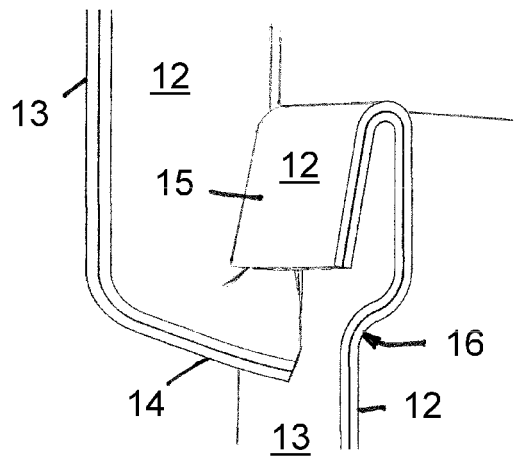
FIG. 4 is a detail view of a top connecting fold and a bottom connecting fold at successive turns of the spirally wound separator body at the beginning of a bending process with which the connecting folds are manufactured.
Figure 5:
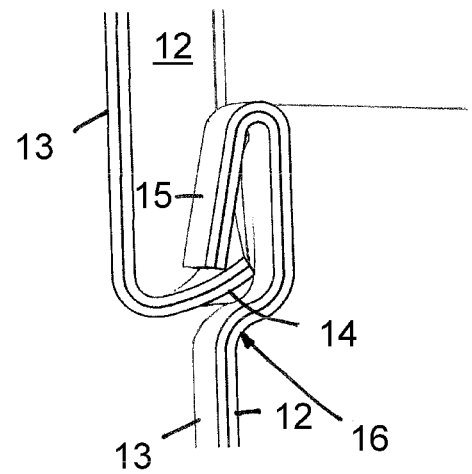
FIG. 5 shows the connecting folds in a further progressed bending state.
Figure 6:
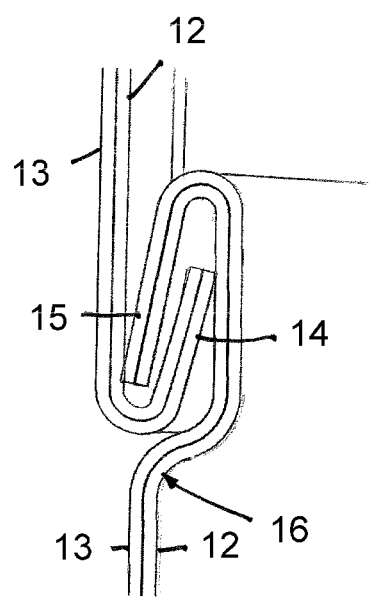
FIG. 6 shows the connecting folds shortly before completion of the bending process.
Figure 7:
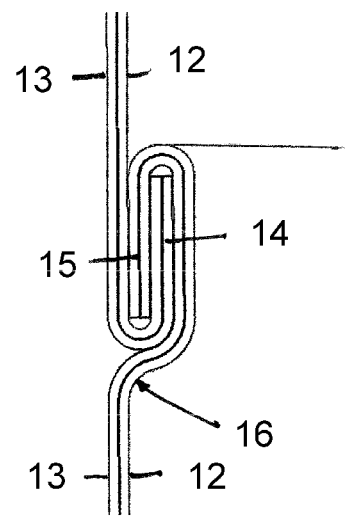
FIG. 7 shows the connecting folds after completion of the bending process in the final mutually engaged connection position.

According to FIG. 4, first the upper rim is bent more strongly to the upper connecting fold 15 while the connecting fold 14 at the bottom rim at this stage is still bent less. According to FIGS. 5 and 6, the bottom rim is bent more and more strongly for producing the connecting fold 14, the latter reaching engagement with the upper connecting fold 15. In FIG. 7, the final position is illustrated in which two successive turns are connected with form fit to each other by the complete engagement of connecting fold 14 and connecting fold 15 in axial direction as well as in radial direction. The bent section of each connecting fold 14, 15 in the final state according to FIG. 7 is parallel to the walls of the turns above and below the connecting folds 14, 15.

In order to enable a smooth inner side 12 as well as a smooth outer side 13 with a continuous wall surface at least in approximation, the bottom turn comprises a cropped section 16 which marks the transition from the non-folded web to the connecting fold 15. In the cropped section 16, the web is displaced radially adjacent to its top rim, namely by an amount that corresponds to twice the thickness of support body 12 and separator body 13. This ensures that the inner side 12 as well as the outer side 13 in neighboring axially displaced turns of the spiral are positioned radially at the same level.

What is claimed is:

1. A separation component for a filter element, the separation component comprising:

a support body comprising a grid structure that permits flow of a fluid through the support body and comprised of a web with a top rim and with a bottom rim;

a separator body comprised of a nonwoven web with a top rim and a bottom rim and covering at least one side face of the support body;

wherein the support body and the separator body are wound together to a spiral shape comprising axially successive turns;

wherein the support body and the separator body together comprise a connecting fold at the respective top rims and a connecting fold at the respective bottom rims, and wherein the connecting fold at the respective top rims and the connecting fold at the respective bottom rims engage each other in the axially successive turns of the spiral shape.

2. The separation component according to claim 1, wherein the connecting fold at the respective top rims is embodied as a bent top rim of the respective webs and the connecting fold at the respective bottom rims is embodied as a bent bottom rim of the respective webs.

3. The separation component according to claim 1, wherein the separator body covers the support body in a region of the connecting fold at the respective top rims and in a region of the connecting fold at the respective bottom rims.

4. The separation component according to claim 1, wherein the separator body is comprised of a coalescer material.

5. The separation component according to claim 1, wherein the separator body completely covers the at least one side face of the support body.

6. The separation component according to claim 1, wherein the separation component comprises a cylindrical spiral shape.

7. The separation component according to claim 1, wherein the connecting fold at the respective top rims and the connecting fold at the respective bottom rims are in form fit engagement with each other in the axially successive turns of the spiral shape.

8. A filter element comprising:
a top end disk;
a bottom end disk; and
a first separation component arranged between the top end disk and the bottom end disk, wherein the first separation component is the separation component according to claim 1.

9. The filter element according to claim 8, further comprising a filter medium body arranged upstream or downstream of the first separation component in a flow direction of the fluid through the filter element.

10. The filter element according to claim 8, further comprising a second separation component arranged upstream or downstream of the first separation component in a flow direction of the fluid through the filter element.

11. A filter device comprising:
a filter element comprising a top end disk, a bottom end disk, and the separation component according to claim 1 arranged between the top end disk and the bottom end disk; and
a filter housing configured to receive the filter element.

12. A method for manufacturing a separation component for a filter element, the method comprising:
arranging a web-shaped separator body comprised of a nonwoven web having a top rim and a bottom rim onto at least one side face of a web-shaped support body comprising a grid structure that permits flow of a fluid through the support body and comprised of a web having a top rim and a bottom rim;
winding the support body and the separator body together to a spiral shape;
during winding, bringing into engagement with each other a connecting fold at the respective top rims of the separator body and the support body of a turn of the spiral shape and a connecting fold at the respective bottom rims of the separator body and the support body of an axially successive turn of the spiral shape.

13. The method according to claim 12, further comprising producing the connecting fold at the respective top rims of the web-shaped separator body and the web-shaped support body and the connecting fold at the respective bottom rims of the web-shaped separator body and the web-shaped support body during winding.

14. A filter element for a filter device, comprising:
a top end disk comprising a central opening;
a closed bottom end disk; and
at least one separation component comprising a support body and a separator body;
wherein the support body comprises a grid structure having a plurality of openings for permitting a fluid to flow through the support body, the support body comprising a web having a top rim and a bottom rim;
wherein the separator body comprises a nonwoven web having a top rim and a bottom rim;
wherein the support body and the separator body are spiral wound together in successive turns;
wherein the top rim of the support body and the top rim of the separator body are bent together to form a first fold connection, and the bottom rim of the support body and the bottom rim of the separator body are bent together to form a second fold connection; and
wherein the first fold connection and the second fold connection are engaged together to join the successive turns.

* * * * *